United States Patent
Nakayama et al.

(10) Patent No.: US 10,797,289 B2
(45) Date of Patent: Oct. 6, 2020

(54) WIRING MODULE

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Osamu Nakayama, Yokkaichi (JP); Naoki Fukushima, Yokkaichi (JP); Katsushi Miyazaki, Yokkaichi (JP); Seishi Kimura, Yokkaichi (JP)

(73) Assignees: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka-Shi, Osaka (JP)

( * ) Notice: Subject to any disclaimer, the term of this patent is extended or adjusted under 35 U.S.C. 154(b) by 111 days.

(21) Appl. No.: 15/769,790

(22) PCT Filed: Oct. 4, 2016

(86) PCT No.: PCT/JP2016/079426
§ 371 (c)(1),
(2) Date: Apr. 20, 2018

(87) PCT Pub. No.: WO2017/068966
PCT Pub. Date: Apr. 27, 2017

(65) Prior Publication Data
US 2018/0315973 A1    Nov. 1, 2018

(30) Foreign Application Priority Data

Oct. 23, 2015    (JP) .................. 2015-208972

(51) Int. Cl.
*H01M 2/20*    (2006.01)
*H01M 2/10*    (2006.01)
*H01M 2/34*    (2006.01)

(52) U.S. Cl.
CPC ......... *H01M 2/202* (2013.01); *H01M 2/1077* (2013.01); *H01M 2/206* (2013.01); *H01M 2/34* (2013.01)

(58) Field of Classification Search
CPC .... H01M 2/202; H01M 2/1077; H01M 2/206; H01M 2/34
See application file for complete search history.

(56) References Cited

U.S. PATENT DOCUMENTS

2014/0038020 A1* 2/2014 Murata ................ H01M 2/105
429/120

FOREIGN PATENT DOCUMENTS

JP    2010205509 A    9/2010
JP    2012164477 A    8/2012
(Continued)

OTHER PUBLICATIONS

International Search Report for Application No. PCT/JP2016/079426 dated Dec. 20, 2016; 6 pages.

*Primary Examiner* — Ula C Ruddock
*Assistant Examiner* — Frank A Chernow
(74) *Attorney, Agent, or Firm* — Reising Ethington, P.C.

(57) ABSTRACT

A power storage module includes: multiple power storage elements that each include a pair of electrode terminals and an electrode arrangement surface; and a battery connection module that is mounted on the multiple power storage elements. The battery connection module includes an insulating protector that is provided in correspondence with a predetermined number of power storage elements. The insulating protector includes: a first position portion that engages (Continued)

with a first positioned portion provided between the pair of electrode terminals on the electrode arrangement surface of one power storage element; and a second positioning portion that engages with the second positioned portion provided in the periphery of at least one of the pair of electrode portions on the electrode arrangement surface of the one electrode terminal or on the electrode arrangement surface of the one other electrode terminal.

5 Claims, 6 Drawing Sheets

(56) References Cited

FOREIGN PATENT DOCUMENTS

| | | |
|---|---|---|
| JP | 2012227004 A | 11/2012 |
| JP | 2013033634 A | 2/2013 |
| JP | 2015187912 A | 10/2015 |

* cited by examiner

WIRING MODULE

CROSS REFERENCE TO RELATED APPLICATIONS

This application claims the priority of Japanese patent application JP2015-208972 filed on Oct. 23, 2015, the entire contents of which are incorporated herein.

TECHNICAL FIELD

The technique disclosed in the present specification relates to a power storage module and a battery connection module, and specifically relates to positioning of a battery connection module mounted on power storage elements of a power storage module.

BACKGROUND ART

Conventionally, the technique disclosed in Patent Document 1 (JP2013-33634A), for example, has been known as the above-described technique for positioning a battery connection module mounted on power storage elements of the power storage module. Patent Document 1 discloses a technique of using an electrode portion for intermediate voltage detection provided between a pair of electrode portions (electrode terminals) of a single battery (power storage element) as a positioned portion, and providing a positioning portion that fits into the positioned portion on a battery wiring module (battery connection module).

SUMMARY

With the above-described conventional technique, the positioning portion provided on the battery connection module is fit into the positioned portion of the power storage element, and thus the connection members (bus bars) and electrode terminals are connected after the battery connection module is positioned with respect to the power storage elements, whereby it is possible to improve the workability of attaching the battery connection module. However, if the dimension between the pair of electrode terminals of the power storage element is large, there is a distance from the positioning position due to the positioning configuration in which the electrode portion for intermediate voltage detection is simply used as the positioned portion, and therefore position misalignment from the desired position is likely to occur between the bus bars and the electrode terminals. If position misalignment occurs between the bus bars and the electrode terminals, depending on the position misalignment amount, there has been a risk that the welding accuracy will decrease when the bus bars and electrode terminals are connected through laser welding.

The technique disclosed in the present specification has been completed based on the foregoing circumstance and provides a power storage module and a battery connection module according to which it is possible to suppress the amount of position misalignment between the electrode terminals and bus bars to a small amount.

A power storage module according to the present embodiment is a power storage module including: a plurality of power storage elements each including a pair of positive and negative electrode terminals and an electrode arrangement surface on which the pair of electrode terminals are arranged; and a battery connection module mounted on the plurality of power storage elements, wherein the battery connection module includes: bus bars that connect the adjacent electrode terminals of the plurality of power storage elements; bus bar holding portions that hold the bus bars; and an insulating protector that includes the bus bar holding portions and is provided in correspondence with a predetermined number of power storage elements that is two or more among the plurality of power storage elements, and the insulating protector includes: a first positioning portion that engages with a first positioned portion provided between the pair of electrode terminals on the electrode arrangement surface of one power storage element among the predetermined number of electrode terminals; and a second positioning portion that engages with a second positioned portion provided in a periphery of at least one of the pair of electrode terminals on the electrode arrangement surface of the one power storage element among the predetermined number of power storage elements, or on the electrode arrangement surface of one other power storage element among the predetermined number of power storage elements.

According to the present configuration, the insulating protector is provided with the second positioning portion that engages with the second positioned portion provided in the periphery of at least one of the pair of electrode terminals on the electrode arrangement surface of one power storage element, as well as the first positioning portion that engages with the first positioned portion provided between the pair of electrode terminals of one electrode terminal. For this reason, even if the dimension between the pair of electrode terminals is large, the amount of position misalignment between the electrode terminals and the bus bar can be suppressed to a small amount. Accordingly, a predetermined welding accuracy can be maintained even in the case where the bus bar and the electrode terminals are laser welded.

In the above-described power storage module, one of the first positioned portion and the first positioning portion may be constituted by a recessed portion including a rectangular opening, the other one of the first positioned portion and the first positioning portion may be constituted by a protruding portion that fits into the recessed portion, one of the second positioned portion and the second positioning portion may be constituted by a column portion including a vertical groove portion that runs in an orthogonal direction to the electrode arrangement surface of a power storage element, and the other one of the second positioned portion and the second positioning portion may be constituted by a protrusion portion that fits into the vertical groove portion.

According to the present configuration, the first positioning portion and the first positioned portion can be given simple configurations, and in this case as well, the amount of position misalignment between the electrode terminals and the bus bar can be suppressed to a small amount due to the configurations of the second positioning portion and the second positioned portion.

Also, in the above-described power storage module, it is possible to use a configuration in which the first positioned portion is provided in the center between the pair of electrode terminals, the second positioned portion is provided at at least one end portion on the electrode arrangement surface of one power storage element, and the first positioning portion and the second positioning portion are respectively provided at positions corresponding to the first positioned portion and the second positioned portion in the insulating protector.

According to the present configuration, even if the electrode terminal is provided on one end portion of the power storage module and the distance between the electrode terminal and bus bar and the central portion between the pair of electrode terminals is large, it is effective for suppressing the amount of positional misalignment between the electrode terminal and the bus bar to a small amount.

Also, in the above-described power storage module, it is possible to use a configuration in which the first positioned portion and the second positioned portion are provided on each power storage element, and the first positioning portion and the second positioning portion are respectively provided at positions corresponding to the first positioned portion and the second positioned portion provided on the same power storage element among the predetermined number of power storage elements.

According to the present configuration, the outer shape of the power storage element need only be of one type, and therefore the step of manufacturing the power storage element is simplified. Also, when the first positioning portion and the second positioning portion are engaged with the first positioned portion and the second positioned portion respectively, it is sufficient to perform the engagement on the same power storage element, and thus the engagement task can be simplified.

Also, a battery connection module according to the present embodiment is a battery connection module including: bus bars that connect adjacent electrode terminals among a plurality of electrode terminals that each include a pair of positive and negative electrode terminals and an electrode arrangement surface on which the pair of electrode terminals are arranged; bus bar holding portions that hold the bus bars; and an insulating protector that is arranged in correspondence with a predetermined number of power storage elements that is two or more among the plurality of power storage elements, and includes the bus bar holding portions, wherein the insulating protector includes: a first positioning portion that engages with a first positioned portion provided between the pair of electrode terminals on the electrode arrangement surface of one power storage element among the predetermined number of electrode terminals; and a second positioning portion that engages with a second positioned portion provided in a periphery of at least one of the pair of electrode terminals on the electrode arrangement surface of the one power storage element among the predetermined number of power storage elements, or on the electrode arrangement surface of one other power storage element among the predetermined number of power storage elements.

According to the technique disclosed in the present specification, even if the dimension between the pair of electrode terminals of the power storage elements is large, the amount of position misalignment between the electrode terminals and the bus bars can be suppressed to a small amount.

DESCRIPTION OF EMBODIMENTS

Figure 5:
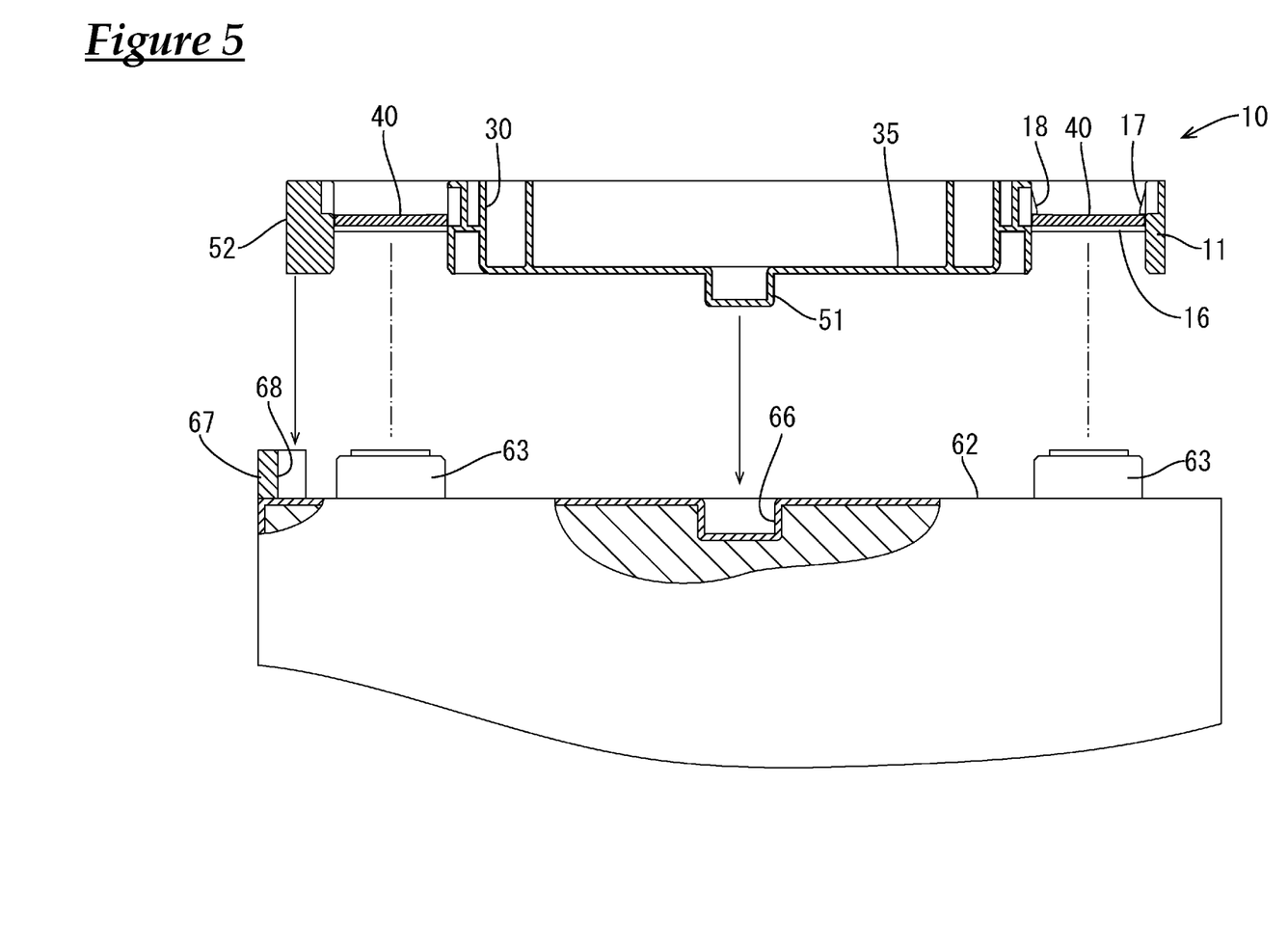
FIG. 5 is a partial cross-sectional view illustrating a fitting correspondence between a positioning portion and a positioned portion.
Figure 6:
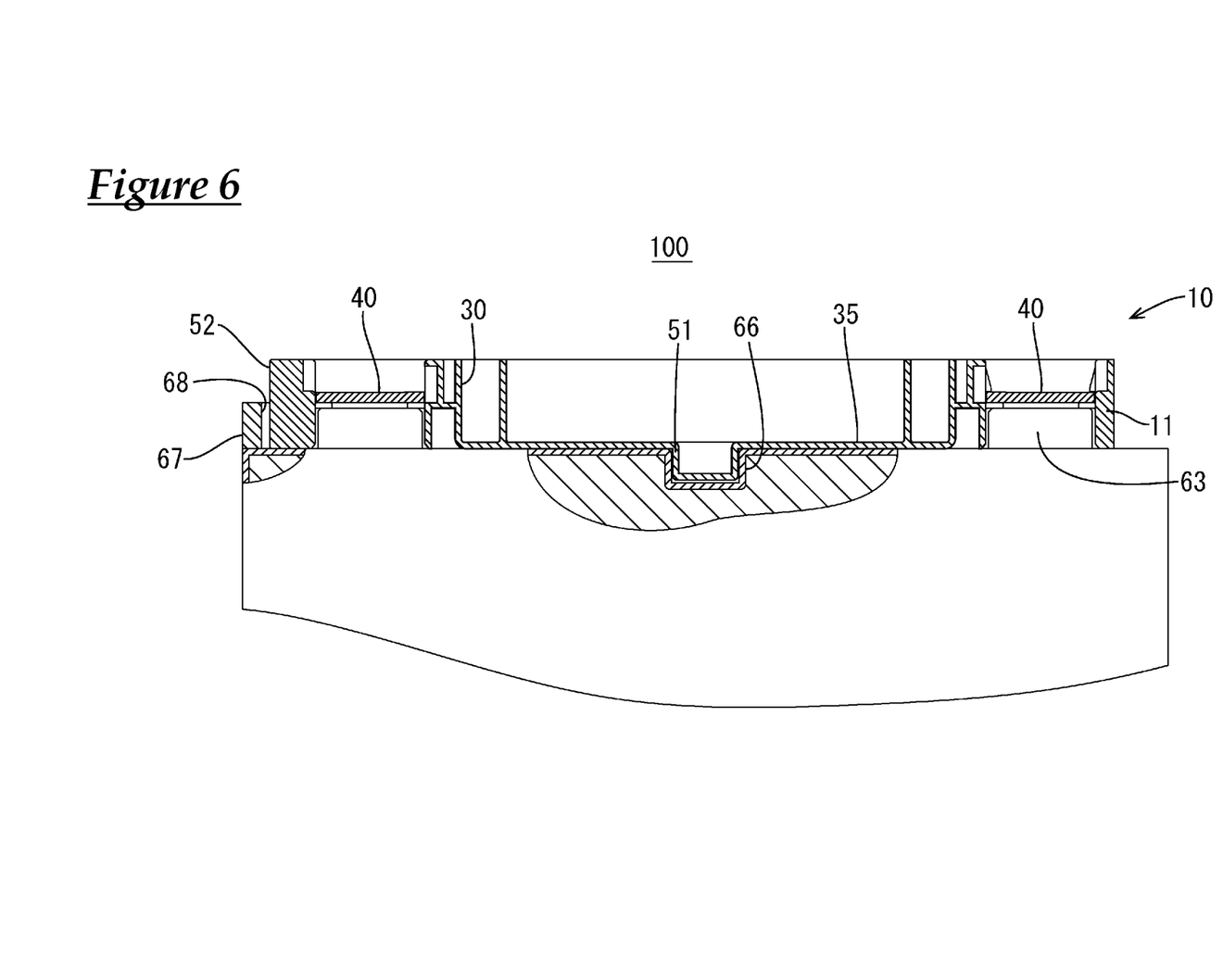
FIG. 6 is a partial cross-sectional view showing a fitting state between a positioning portion and a positioned portion.

An embodiment will be described with reference to FIGS. 1 to 6. Note that FIGS. 5 and 6 are partial cross-sectional views taken along line A-A in FIG. 1. The power storage module 100 of the present embodiment is mounted in a vehicle (not shown) such as an electric automobile or a hybrid automobile, for example, and is used as a power source for driving the vehicle.

Figure 1:
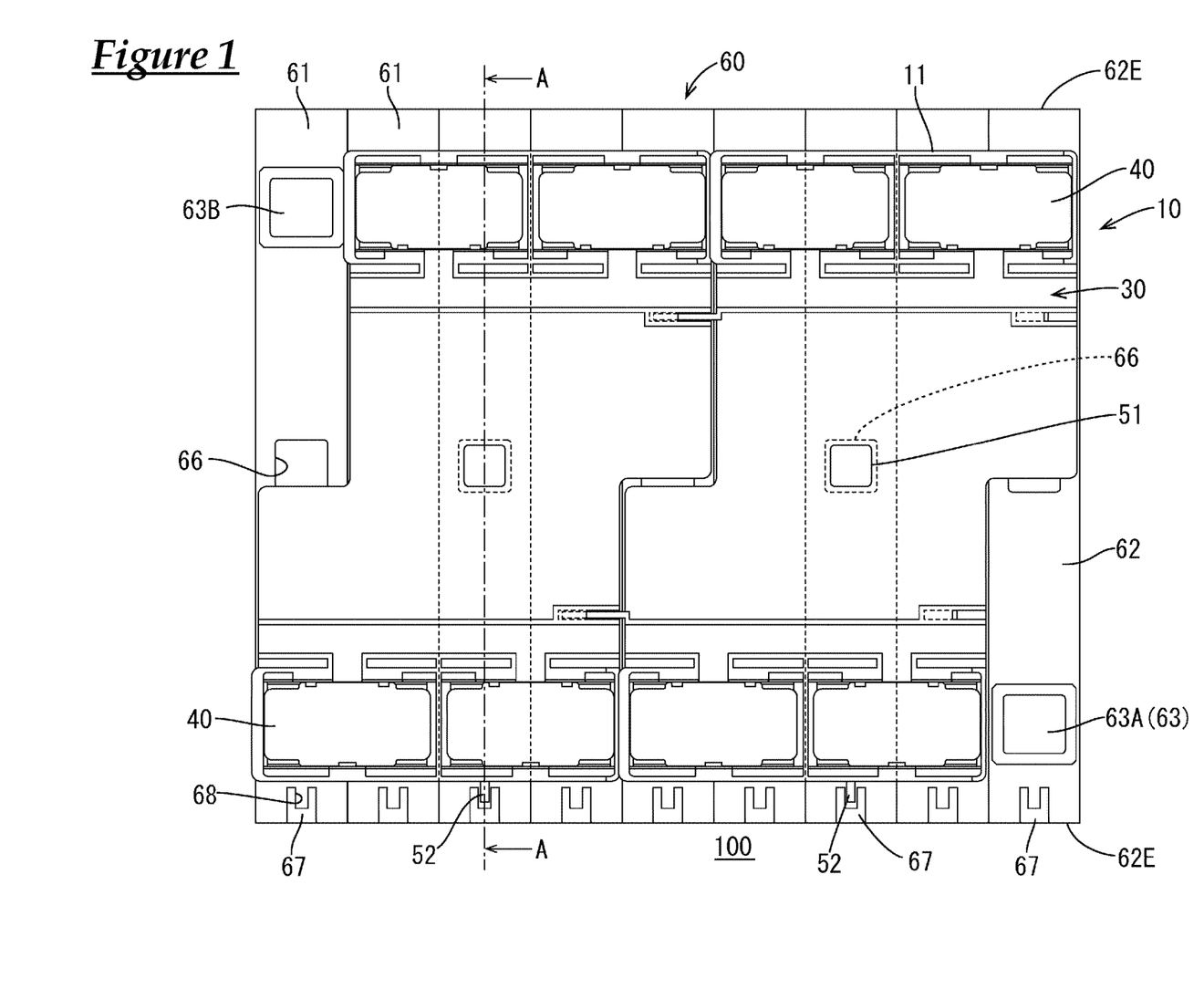
FIG. 1 is a plan view of a power storage module according to an embodiment.

Note that in the following description, the left side of FIG. 1 is denoted as "left", the right side is denoted as "right", the upper portion of FIG. 6 is denoted as "up", and the lower portion is denoted as "down". Also, for multiple identical members, one member is denoted by a reference sign and the other members are not denoted by reference signs in some cases.

Figure 2:
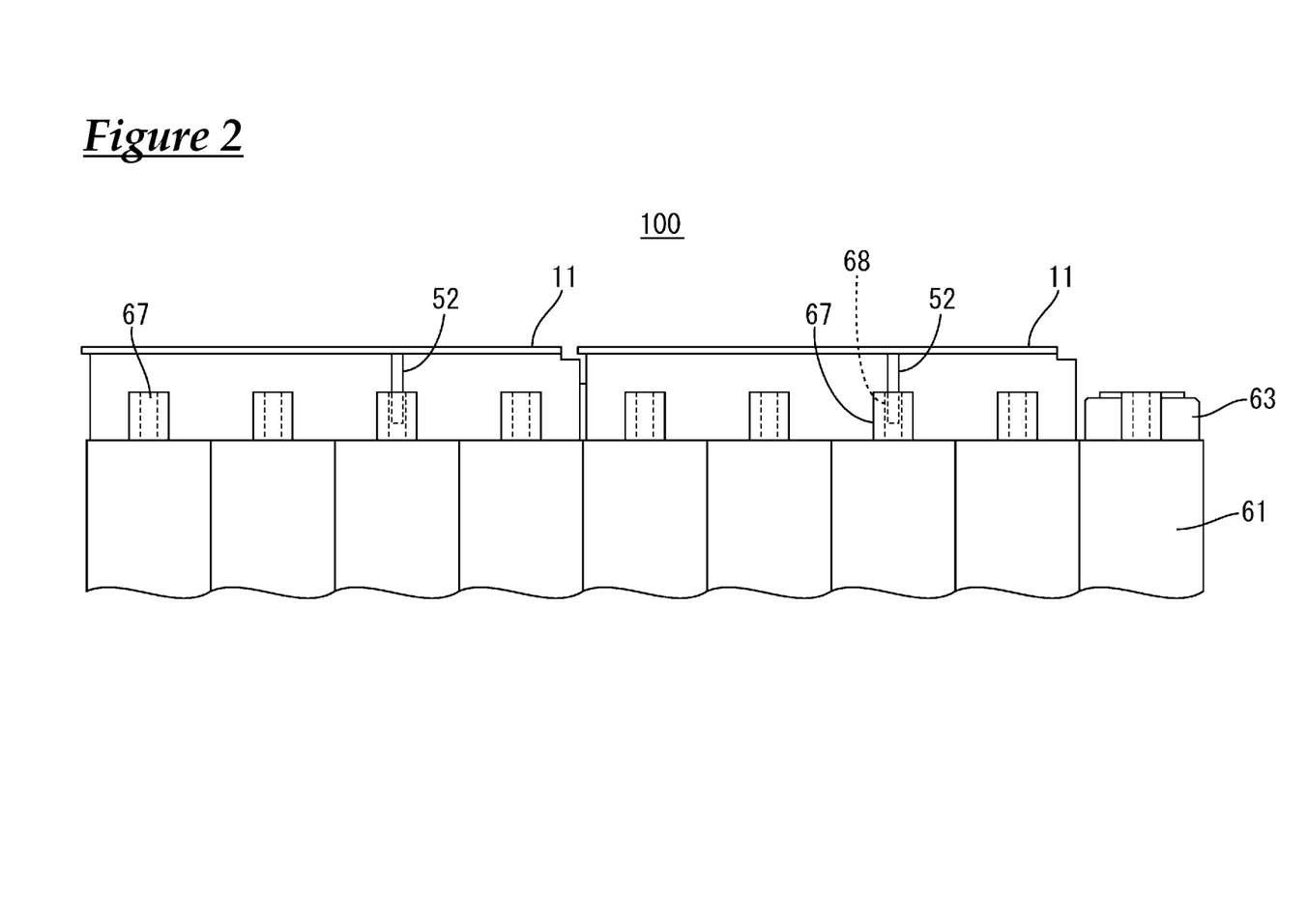
FIG. 2 is a side view of a power storage module.

As shown in FIGS. 1 and 2, a power storage module 100 of the present embodiment is mainly constituted by a power storage element group 60 (see FIG. 3) constituted by aligning multiple power storage elements 61, and a battery connection module 10 (see FIG. 4) attached to the power storage element group 60.

Figure 3:
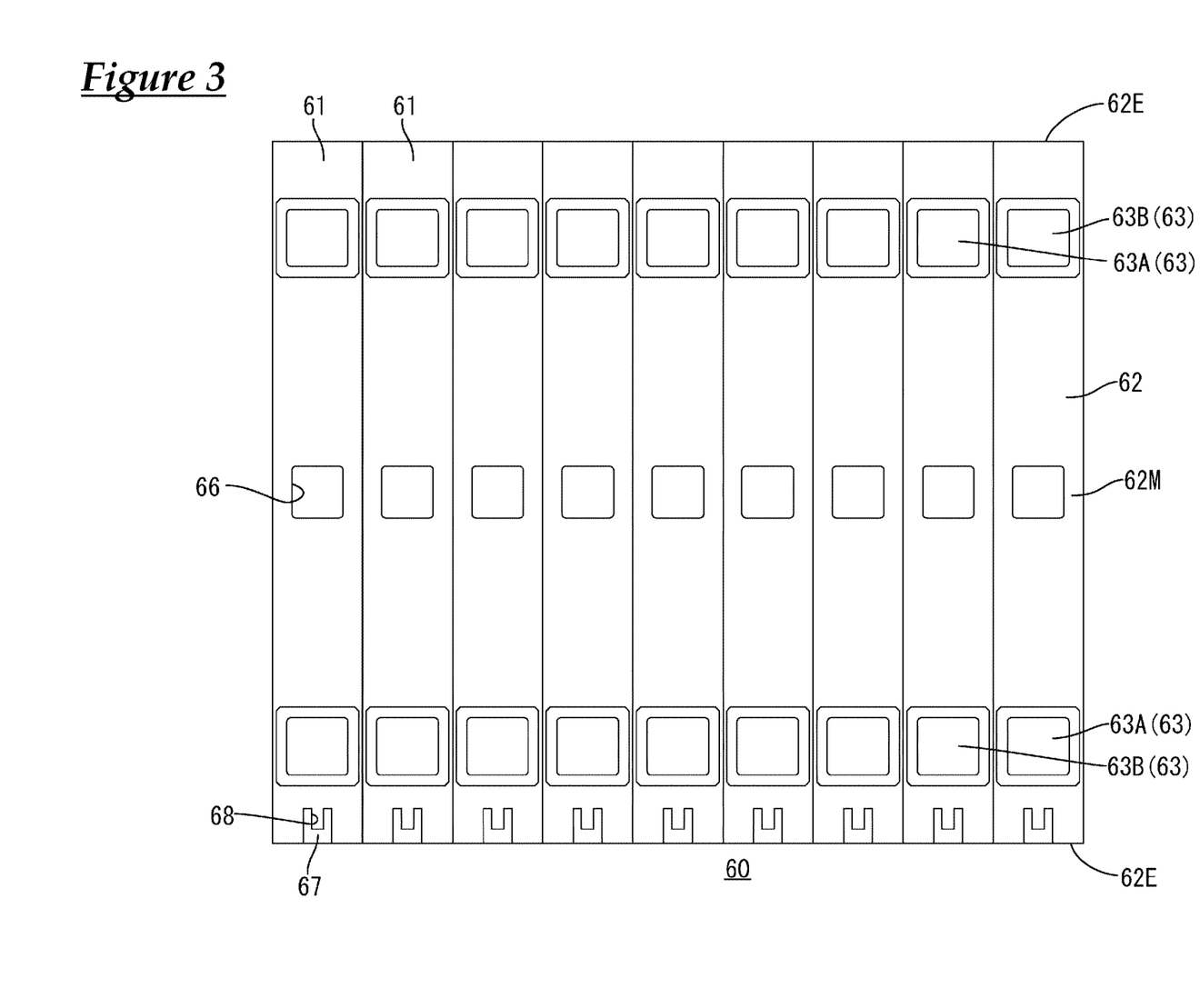
FIG. 3 is a plan view of a power storage element group.

The power storage elements 61 of the present embodiment are, for example, secondary batteries. As shown in FIG. 3, multiple power storage elements 61 are aligned to form the power storage element group 60.

The power storage elements 61 have outer shapes that are flat cuboids, and as shown in FIG. 3, each includes an electrode arrangement surface 62 that is perpendicular to the surfaces opposing the adjacent power storage elements 61. A pair of electrode terminals 63 are arranged on the electrode arrangement surface 62 at positions near the two end portions (62E, 62E) in the lengthwise direction. One of the electrode terminals 63 is a cathode terminal 63A and the other is an anode terminal 63B. The electrode terminals 63 are made of metal and protrude from the electrode arrangement surface 62 in the form of rectangular tubes (see FIG. 5).

On the electrode arrangement surface 62 of each power storage element 61, a central portion 62M between the pair of electrode terminals 63 is provided with a recessed portion (an example of a "first positioned portion") 66 into which a protruding portion (an example of a "first positioning portion") 51 of a later-described insulating protector 11 fits. The recessed portion 66 has a rectangular opening and has a form that is depressed in a recessed shape from the electrode arrangement surface 62 (see FIGS. 3 and 5).

Also, on the electrode arrangement surface 62 of each power storage element 61, one end portion 62E is provided with a cuboid column portion (an example of a "second positioned portion") 67 that includes a vertical groove portion 68 into which a protruding portion (an example of a "second positioning portion") 52 of the insulating protector 11 is fit. The vertical groove portion 68 is a groove that runs in an orthogonal direction (vertical direction in FIG. 6) to the electrode arrangement surface 62 (see FIGS. 3 and 5).

Multiple power storage elements 61 are aligned such that in two adjacent power storage elements 61, electrode terminals 63 with different polarities are adjacent to each other (i.e., such that the cathode terminal 63A of one power storage element 61 and the anode terminal 63B of another power storage element 61 adjacent thereto are adjacent to each other).

1-2. Battery Connection Module

The battery connection module 10 is a member that is to be attached to the surface constituted by the electrode arrangement surfaces 62 of the power storage elements 61 in the power storage element group 60. The battery connection module 10 includes two insulating protectors 11, bus bars 40 that are held in the insulating protectors 11 and connect the cathode terminals 63A and anode terminals 63B of adjacent power storage elements 61, voltage detection terminals (not shown) that are arranged overlaid on the bus bars 40 and are electrically connected thereto, and detection wires (not shown) that are connected to the voltage detection terminals.

Figure 4:
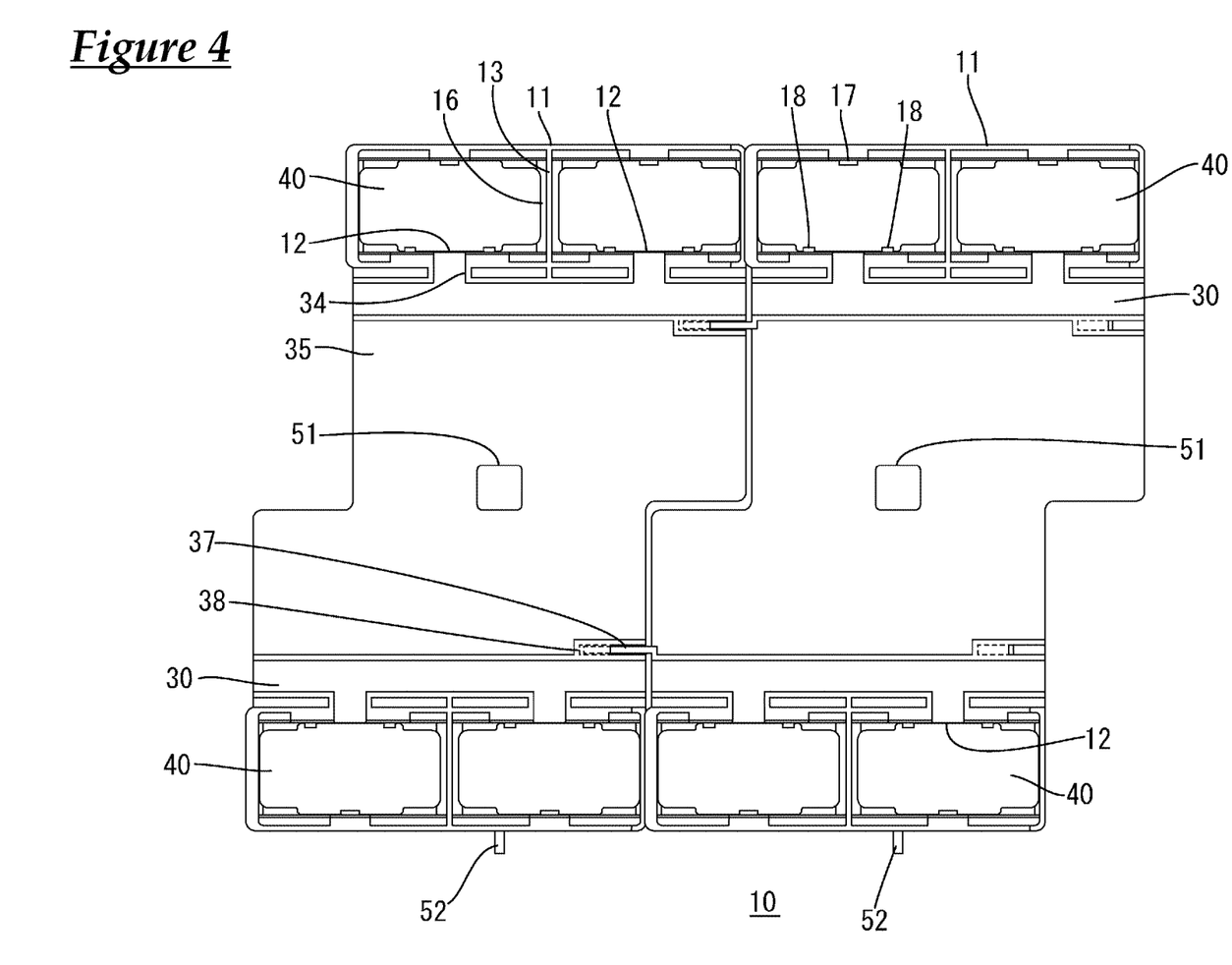
FIG. 4 is a plan view of a battery connection module.

The bus bars 40 are formed by punching out metal plates, and as shown in FIG. 4, the bus bars 40 are members that are approximately rectangular plate-shaped overall and have their four corners cut out in flat rectangles. Examples of materials for the bus bars 40 include copper, copper alloys, aluminum, aluminum alloys, and stainless steel (SUS).

In the present embodiment, the two insulating protectors 11 are aligned along the alignment direction of the multiple power storage elements 61. The insulating protectors 11 are constituted by an insulating material such as synthetic resin. As shown in FIG. 4, the insulating protectors 11 each include a pair of bus bar holding portions 12 that are open in the vertical direction and contain and hold the bus bars 40, a pair of wire containing grooves 30 for containing detection wires connected to the voltage detection terminals arranged overlaid on the bus bars 40, and the like.

The bus bar holding portions 12 include rectangular tube-shaped containing walls 13 that hold the bus bars 40 in their interiors and perform holding such that the bus bars 40 are insulated from adjacent bus bars 40, and the containing walls 13 function as protection walls for the adjacent electrode terminals 63. The bus bar holding portions 12 each include a pair of mounting portions 16 that are formed on the two end portions in the lengthwise direction, and a first retaining piece 17 and second retaining pieces 18 that are formed on the two end portions in the width direction (see FIG. 4).

Also, the pair of wire containing grooves 30 provided on the insulating protectors 11 are coupled by plate-shaped coupling portions 35. The coupling portions 35 are each provided with an engagement portion 37 and an engagement receiving portion 38 for coupling the adjacent insulating protectors 11.

Furthermore, the coupling portions 35 of the insulating protectors 11 are each provided with a protruding portion 51 that fits into a recessed portion 66 provided at a central portion 62M of an electrode arrangement surface 62 of a power storage element 61 (see FIGS. 4 and 5). Also, in the insulating protectors 11, protrusion portions 52 that each fit into a column portion 67 provided on the one end portion 62E of an electrode arrangement surface 62 of a power storage element 61, and that specifically fit into the vertical groove portion 68 of a column portion 67, are provided so as to protrude outward from the outer sides of the bus bar holding portions 12 (see FIGS. 4 and 5). The protruding portions 51 and the column portions 67 are provided on the same power storage elements 61.

When the above-described power storage module 100 of the present embodiment is to be assembled, first, the two insulating protectors 11 are coupled together using the engagement portions 37 and the engagement receiving portions 38. Next, the bus bars 40 are contained in the bus bar containing portions 12 of the insulating protectors 11. The bus bars 40 are pressed downward while being guided by the containing walls 13 of the bus bar holding portions 12, and when the bus bars 40 come into contact with the first retaining pieces 17 and the second retaining pieces 18, they cause the retaining pieces 17 and 18 to elastically deform downward while advancing further downward. Then, upon the bus bars 40 being pressed until they have gone past the first retaining pieces 17 and the second retaining pieces 18, the first retaining pieces 17 and the second retaining pieces 18 elastically revert, whereby the bus bars 40 are held in a retained state in which they are pressed from above (see FIG. 5).

The bus bars 40 contained in the bus bar holding portions 12 are supported from below due to the two end portions in the lengthwise direction thereof being mounted on the pairs of mounting portions 16. In this state, welded portions on the underside surfaces (lower surfaces) of the bus bars 40 are exposed to the lower side.

Next, the voltage detection terminals and the detection wires connected to the voltage detection terminals are arranged at predetermined positions in the insulating protectors 11. At this time, the voltage detection terminals are connected to the bus bars 40 and the detection wires are contained in the wire containing grooves 30.

The battery connection module 10 assembled in this manner is attached to the electrode arrangement surfaces 62 of the power storage element group 60. Specifically, as shown in FIG. 5, the protruding portions 51 of the insulating protectors 11 are inserted (fit) into the recessed portions 66 of the power storage elements 61 from above, and the protruding portions 52 of the insulating protectors 11 are inserted (fit) into the vertical groove portions 68 of the power storage elements 61 from above. Upon doing so, the containing walls 13 surround the adjacent pairs of electrode terminals 63. Also, at this time, the leading end portions (upper surfaces) of the electrode terminals 63 come into contact with the lower surfaces of the bus bars 40 that are exposed downward (see FIG. 6). In this state, predetermined positions of the bus bars 40 are irradiated with lasers by a laser irradiation apparatus (not shown) that is arranged above the battery connection module 10, and the bus bars 40 and the electrode terminals 63 are connected through laser welding. Thus, the power storage module 100 is completed (see FIG. 6).

Next, actions and effects of the present embodiment will be described.

In the present embodiment, the insulating protectors 11 are each provided with a protruding portion (first positioning portion) 51 that engages with a recessed portion (first positioned portion) 66 provided between the pair of electrode terminals 63A and 63B on the electrode arrangement surface 62 of one power storage element 61 among a predetermined number (in the present embodiment, four) of power storage elements 61 that is two or more, among the multiple power storage elements 61. Also, in addition to the protruding portion 51, the insulating protectors 11 are each further provided with a protrusion portion (second positioning portion) 52 that engages with a column portion (second positioned portion) 67 provided in the vicinity of at least one of the pair of electrode terminals 63A and 63B on the electrode arrangement surface 62 of one power storage element. For this reason, even if the dimension between the pair of electrode terminals is large, the amount of position misalignment between the adjacent electrode terminals 63A and 63B and the bus bar 40 can be suppressed to a small amount. Accordingly, a predetermined welding accuracy can be maintained even in the case where the bus bar 40 and the adjacent electrode terminals 63A and 63B are laser welded.

Also, the first positioning portions and the first positioned portions can be given simple configurations using the protruding portions 51 and the recessed portions 66. Even if the first positioning portion and the first positioned portion are given simple configurations in this manner, the amount of position misalignment between the adjacent electrode terminals 63A and 63B and the bus bar 40 can be suppressed to a small amount due to the configurations of the further-provided second positioning portion (protruding portion 52) and the second positioned portion (column portion 67).

Also, in the present embodiment, the recessed portion (first positioned portion) 66 is provided in the central portion 62M between the pair of electrode terminals 63A and 63B on the electrode arrangement surface 62 of one power storage element 61. Also, as the periphery of the electrode terminal, the column portion (second positioned portions) 67 is provided on the one end portion 62E on the electrode arrangement surface 62 of the one power storage element 61. For this reason, it is effective for suppressing the amount of position misalignment between the electrode terminals 63 and the bus bars 40 to a small amount even in the case where the dimension between the pair of electrode terminals 63A and 63B is large, the electrode terminals 63A and 63B are provided at the end portions of the power storage elements 61, and the distances between the electrode terminals 63 and bus bars 40 and the central portions (63M) between the pairs of electrode terminals are large.

Also, in the present embodiment, the recessed portions 66 and the column portions 67 are provided on the power storage elements 61, and the protruding portions 51 and the protrusion portions 52 are respectively provided at positions corresponding to the recessed portions 66 and the column portions 67 provided on the same power storage elements 61 among the four (a predetermined number that is two or more) power storage elements 61. For this reason, the outer shapes of the power storage elements 61 need only be of one type, and therefore the manufacturing process for the power storage elements 61 is simplified. Also, when the protruding portions 51 and protrusion portions 52 are engaged with the recessed portions 66 and column portions 67 respectively, it is sufficient that they are engaged to the same power storage elements 61, and thus the engagement task is simplified.

Other Embodiments

The technique disclosed in the present specification is not limited to the embodiment described through the above description and drawings, and for example, the following embodiments are also encompassed within the technical scope.

In the above-described embodiment, an example was given in which the column portion (second positioning portion) 67 is provided on the one end portion 62E (an example of "periphery of one of a pair of electrode terminals") on the electrode arrangement surface 62 of each power storage element 61, but there is no limitation to this. The column portions 67 may be provided on the two end portions 62E and 62E on the electrode arrangement surface 62 of each power storage element 61. In this case, the insulating protectors 11 are also each provided with two protrusion portions 52, in correspondence with the column portions 67.

Also, the position at which the second positioned portion is provided (periphery of the pair of electrode terminals) is not limited to the one end portion 62E of the electrode arrangement surface 62, as shown in FIG. 3. For example, it may also be provided at a position near the wire containing groove 30. Also, the position at which the recessed portion (first positioned portion) 66 is provided is not necessarily limited to the central portion between the pair of electrode terminals, as shown in FIG. 3.

In the above-described embodiment, an example was shown in which the protruding portion 51 and the protrusion portion 52 of an insulating protector 11 are provided at respective positions corresponding to the recessed portion 66 and the column portion 67 provided on the same power storage element 61 among the four (two or more) power storage elements 61, but there is no limitation to this. For example, the protruding portion 51 and the protrusion portion 52 may be provided on the insulating protector 11 such that the power storage element 61 provided with the recessed portion 66 into which the protruding portion 51 fits, and the power storage element 61 provided with the column portion 67 into which the protrusion portion 52 fits are different. In other words, the protruding portion 51 and the protrusion portion 52 of the insulating protector 11 may be provided at positions corresponding to different power storage elements 61, and as shown in FIG. 1, may be provided at positions aligned in a straight line.

In the above-described embodiment, an example was given in which the recessed portion (first positioned portion) 66 and the column portion (second positioned portion) 67 are provided on power storage elements 61, but there is no limitation to this. For example, the recessed portion 66 and the column portion 67 may be provided only on the power storage element 61 at the position corresponding to the protruding portion (first positioning portion) 51 and the protrusion portion (second positioning portion) 52 provided on the insulating protector 11.

In the above-described embodiments, an example was given in which the first positioned portion is constituted by the recessed portion 66, the first positioning portion is constituted by the protruding portion 51, the second positioned portion is constituted by the column portion 67 including the vertical groove portion 68, and the second positioning portion is constituted by the protrusion portion 52 that fits into the vertical groove portion 68, but the form in which the positioned portions and the positioning portions are constituted is not limited to this. For example, it is possible to use the inverse configuration, that is, the first positioning portion may be constituted by the recessed portion, the first positioned portion may be constituted by the protruding portion, the second positioning portion may be constituted by the column portion including the vertical groove portion, and the second positioned portion may be constituted by a protrusion portion that fits into the vertical groove portion.

In the above-described embodiment, an example was given in which the battery connection module 10 is constituted due to two insulating protectors 11 being coupled, but the number of insulating protectors 11 to be coupled is not limited to this. For example, the battery connection module 10 may be constituted by one insulating protector 11, or may be constituted by four insulating protectors 11. Also, the number of bus bar holding portions 12 included in the one insulating protector 11 is not limited to two. For example, four bus bar holding portions 12 may be included in one insulating protector 11.

In the above-described embodiment, an example was given in which the bus bars 40 and the electrode terminals 63 are laser welded, but the technique disclosed in the present specification can be applied also to a battery connection module having a configuration in which connection is performed using bolts and nuts.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10 Battery connection module
11 Insulating protector
12 Bus bar holding portion
40 Bus bar
51 Protruding portion (first positioning portion)
52 Protrusion portion (second positioning portion)
61 Power storage element
62 Electrode arrangement surface
63 Electrode terminal
63A Cathode terminal
63B Anode terminal
66 Recessed portion (first positioned portion)
67 Column portion (second positioned portion)
68 Vertical groove portion
100 Power storage module

The invention claimed is:

1. A power storage module, comprising:
a plurality of power storage elements each including a pair of positive and negative electrode terminals and an electrode arrangement surface, for each power storage element, the pair of electrode terminals are both arranged on the electrode arrangement surface; and
a battery connection module mounted on the plurality of power storage elements, the battery connection module includes:
bus bars that connect the adjacent electrode terminals of the plurality of power storage elements;
bus bar holding portions that hold the bus bars; and
an insulating protector that includes the bus bar holding portions and is provided in correspondence with a predetermined number of power storage elements that is two or more among the plurality of power storage elements, the insulating protector includes:
a first positioning portion that engages with a first positioned portion provided between the pair of electrode terminals on the electrode arrangement surface of one power storage element among the predetermined number of electrode elements; and
a second positioning portion that engages with a second positioned portion provided in a periphery of at least one of the pair of electrode terminals on the electrode arrangement surface of the one power storage element among the predetermined number of power storage elements, or on the electrode arrangement surface of one other power storage element among the predetermined number of power storage elements,
wherein the first positioning portion is one of a protruding portion or a recessed portion and the first positioned portion is the other of the protruding portion or the recessed portion, and wherein the first positioning portion and the first positioned portion fit together.

2. The power storage module according to claim 1, wherein the recessed portion includes a rectangular opening, the protruding portion fits into the recessed portion,
one of the second positioned portion and the second positioning portion is constituted by a column portion including a vertical groove portion that runs in an orthogonal direction to the electrode arrangement surface of a power storage element, and
the other one of the second positioned portion and the second positioning portion is constituted by a protrusion portion that fits into the vertical groove portion.

3. The power storage module according to claim 1, wherein the first positioned portion is provided in the center of the electrode arrangement surface between the pair of electrode terminals,
the second positioned portion is provided at at least one end portion on the electrode arrangement surface of one power storage element, and
the first positioning portion and the second positioning portion are respectively provided at positions corresponding to the first positioned portion and the second positioned portion in the insulating protector.

4. The power storage module according to claim 1, wherein the first positioned portion and the second positioned portion are provided on each power storage element, and
the first positioning portion and the second positioning portion are respectively provided at positions corresponding to the first positioned portion and the second positioned portion provided on the same power storage element among the predetermined number of power storage elements.

5. A battery connection module, comprising:
bus bars that connect adjacent electrode terminals among a plurality of electrode elements that each include a pair of positive and negative electrode terminals and an electrode arrangement surface, for each electrode element, the pair of electrode terminals are both arranged on the electrode arrangement surface;
bus bar holding portions that hold the bus bars; and
an insulating protector that is arranged in correspondence with a predetermined number of power storage elements that is two or more among the plurality of power storage elements, and includes the bus bar holding portions, the insulating protector includes:
a first positioning portion that engages with a first positioned portion provided between the pair of electrode terminals on the electrode arrangement surface of one power storage element among the predetermined number of electrode elements; and
a second positioning portion that engages with a second positioned portion provided in a periphery of at least one of the pair of electrode terminals on the electrode arrangement surface of the one power storage element among the predetermined number of power storage elements, or on the electrode arrangement surface of one other power storage element among the predetermined number of power storage elements,
wherein the first positioning portion is one of a protruding portion or a recessed portion and the first positioned portion is the other of the protruding portion or the recessed portion, and wherein the first positioning portion and the first positioned portion fit together.

* * * * *